United States Patent

Borchert et al.

[11] Patent Number: 5,292,056
[45] Date of Patent: Mar. 8, 1994

[54] METHOD OF WELDING HEAT EXCHANGERS

[75] Inventors: Werner Borchert, Mülheim-Ruhr; Hans-Henning von Cleve, Bochum, both of Fed. Rep. of Germany

[73] Assignee: GEA Luftkuhler GmbH, Bochum, Fed. Rep. of Germany

[21] Appl. No.: 17,337

[22] Filed: Feb. 11, 1993

Related U.S. Application Data

[62] Division of Ser. No. 804,763, Dec. 9, 1991, abandoned.

[30] Foreign Application Priority Data

Dec. 8, 1990 [DE] Fed. Rep. of Germany ....... 4039293

[51] Int. Cl.$^5$ ..................... B23K 31/02; B23K 101/14
[52] U.S. Cl. ............................... 228/183; 29/890.047; 29/890.054; 219/121.14; 228/185
[58] Field of Search ............... 165/152, 153, 182, 151; 228/258, 183, 185, 165; 138/171; 29/890.047, 890.054; 219/121.14, 121.64

[56] References Cited

U.S. PATENT DOCUMENTS

| | | | |
|---|---|---|---|
| 2,375,661 | 5/1945 | Karmazin | 228/258 X |
| 3,003,749 | 10/1961 | Morse | 165/152 |
| 4,332,293 | 6/1982 | Hiramatsu | 165/153 |
| 4,529,034 | 7/1985 | Saperstein | 165/134.1 |
| 4,644,129 | 2/1987 | Miller | 219/121.14 |
| 4,661,677 | 4/1987 | LaRocca | 219/121.64 |
| 4,685,318 | 8/1987 | Ueda et al. | 72/185 |
| 5,026,611 | 6/1991 | Usui et al. | 228/258 X |

FOREIGN PATENT DOCUMENTS

| | | | |
|---|---|---|---|
| 2102744 | 8/1972 | Fed. Rep. of Germany . | |
| 3044507A1 | 8/1981 | Fed. Rep. of Germany . | |
| 3606253A1 | 11/1986 | Fed. Rep. of Germany . | |
| 103295 | 8/1980 | Japan | 228/183 |
| 56-3895 | 1/1981 | Japan | 165/153 |
| 56-80698 | 7/1981 | Japan | 165/152 |
| 396810 | 12/1960 | Switzerland | 138/171 |
| 1242397 | 8/1971 | United Kingdom | 165/153 |
| 2071304A | 9/1981 | United Kingdom | 165/151 |

*Primary Examiner*—Kenneth J. Ramsey
*Attorney, Agent, or Firm*—Feiereisen & Kueffner

[57] ABSTRACT

A heat exchanger includes exchanger tubes which are narrow in flow direction of an outer exchanger medium. Always two adjacent exchanger tubes are connected to each other by fins which are either U-shaped individual or are components of a meander-like fin strip. The tube sides are connected to bases of the individual fins or to contact portions of the fin strips by welding, particularly by fusion welding on the inner surfaces of the tube sides. The exchanger tubes are formed by two tube shells which are welded together at the longitudinal edges thereof after two adjacent tube shells have been connected to each other by the fins. The ends of the tubes are placed in tube plates. The resulting heat exchanger is completely galvanized and does not require support structures.

2 Claims, 2 Drawing Sheets

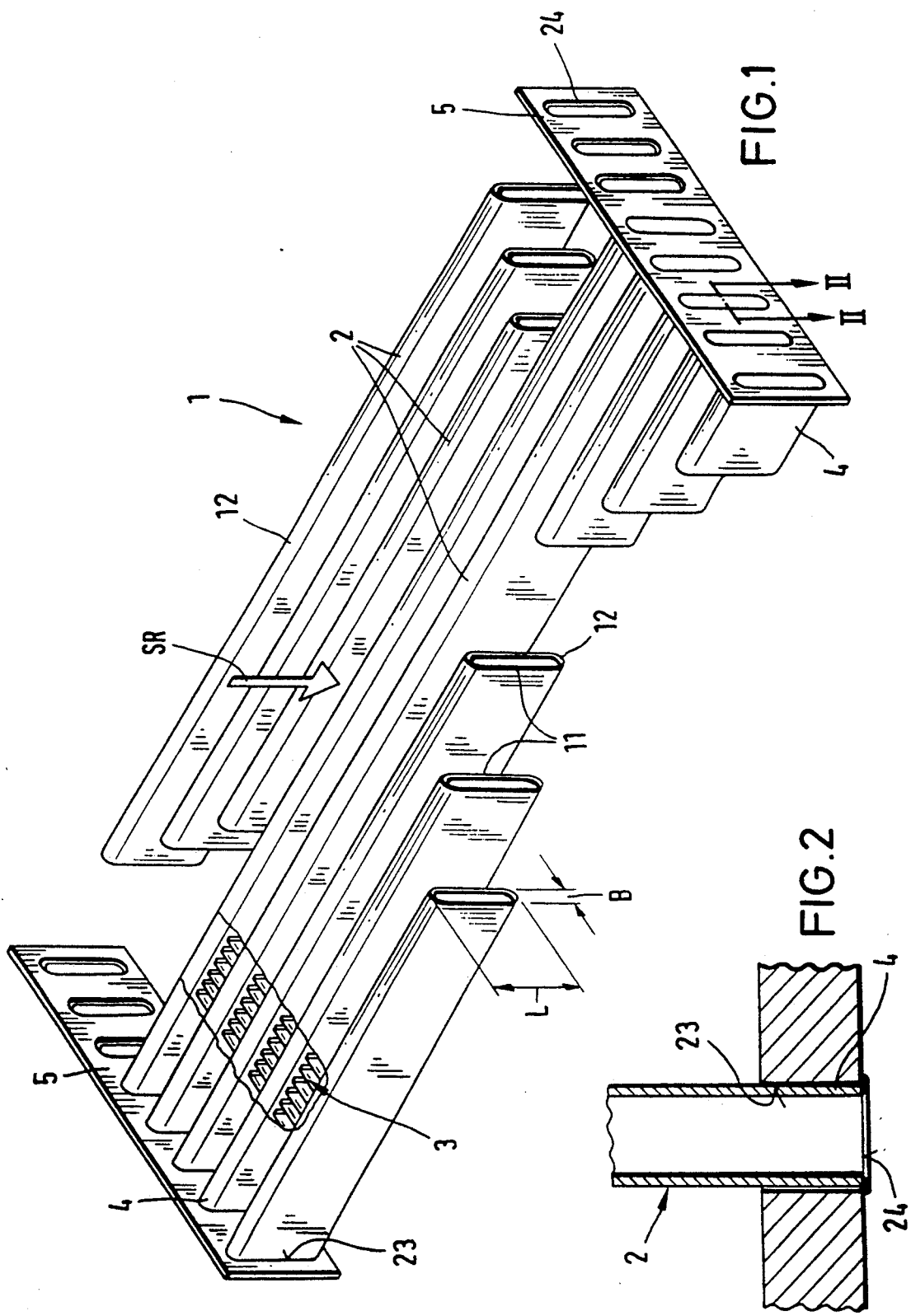

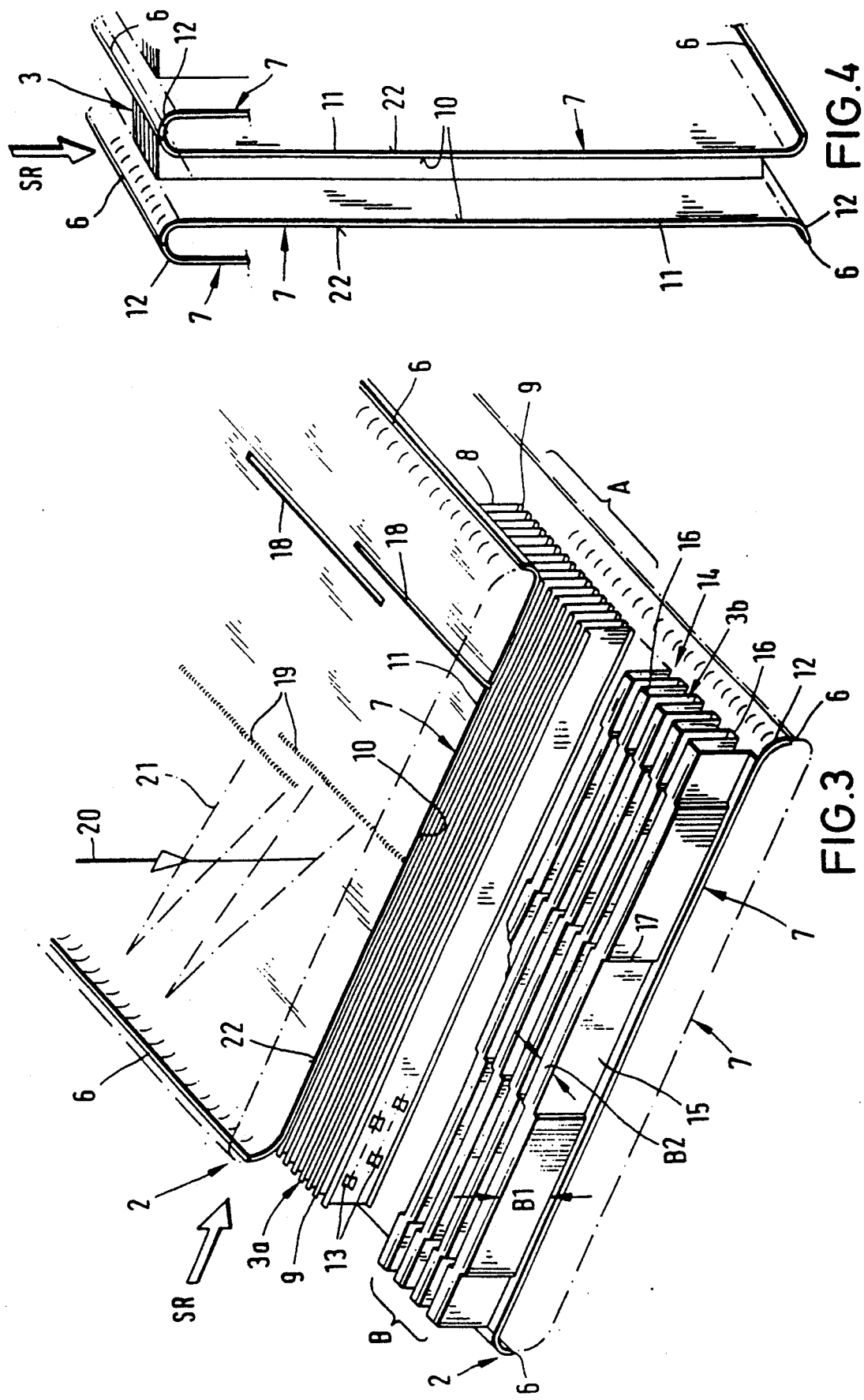

METHOD OF WELDING HEAT EXCHANGERS

This is a division of U.S. application Ser. No. 07/804,763, filed Dec. 9, 1991, now abandoned.

BACKGROUND OF THE INVENTION

1. Field of the Invention

The present invention relates to a heat exchanger including exchanger tubes equipped with fins which extend transversely of the sides of the tubes. The exchanger tubes have an elongated cross-section in the flow direction of the outer exchanger medium. The exchanger tubes have a length which is several times greater than the width thereof. The exchanger tubes are arranged in a row extending transversely of the flow direction of the outer exchanger medium and the tubes are with the ends thereof attached to tube plates.

2. Description of the Related Art

German patent 34 19 734 discloses a heat exchanger which is capable of exchanging heat, for example, between gases and liquids or between gases and condensing vapors. Such a heat exchanger is used predominantly for cooling air or condensing vapors by means of air.

Steel fins are used especially in connection with exchanger tubes of steel. The steel fins are dip-galvanized. Such fins are punched in appropriate machines from plates or strips, are provided with holes adapted to the cross-section of the exchanger tubes and are subsequently pushed in the longitudinal direction onto the exchanger tubes. The subsequent galvanization by dipping not only has the purpose of protecting the exchanger tubes and the fins, but simultaneously produces the metal-to-metal connection of the exchanger tubes with the fins.

The exchanger tubes which are slender in the flow direction of the outer exchanger medium and are essentially oval, are arranged in at least one row next to each other between two tube plates. The tube ends are attached to the tube plates. In addition to the tube plates, stable support structures are used for connecting the exchanger tubes.

In the above-described exchanger tubes whose cross-section is non-circular, the fins as well as the sides of the tubes connected to the fins are subjected to bending moments which occur, especially when vacuum exists in the exchanger tubes.

If a certain width of the sides of the tubes, for example, approximately 200 mm, is exceeded in such exchanger tubes, and if the fin dimensions and rib spacings are conventional, i.e., having a thickness of approximately 0.35 mm, a height of approximately 15 mm and a spacing of approximately 2.5 mm, and the sides of the tubes have a conventional thickness of about 1.5 mm, it may easily occur that the permissible bending stresses of the thin fins are exceeded and distorsions of the fins are caused as a result. Moreover, the connection between the exchanger tubes and the ribs which is usually effected by zinc may be damaged. This damage results in the significant disadvantage that the flow of heat between the exchanger tubes and the fins is disturbed, without the reason for this problem being visible or apparent.

In manufacturing the known heat exchanger, the machine procedures of punching out the fins and sliding the ribs onto the exchanger tubes must be carried out with high precision, so that it is ensured that the zinc provides as close as possible a connection between the exchanger tubes and the fins. These procedures are very complicated and cumbersome. Since, in addition, the fins are slid over the exchanger tubes, a significant amount of material is cut out of the fins to provide for the cross-section of the exchanger tubes. A large quantity of this material which has ben cut out is inevitably discarded unused as scrap material.

Another property of the known heat exchanger is the fact the heat exchanger tubes are galvanized individually. For this purpose, each exchanger tube must be pressed flat and tightly welded at the ends thereof, so that only the outer surfaces are pickled and passivated and the inner surfaces are not galvanized. This is also cumbersome and complicated. After the exchanger tubes have been galvanized, it is necessary to remove the ends which have been pressed flat and welded. This also requires an additional operation and produces essentially useless waste material.

Subsequently, it is necessary to join the individual exchanger tubes together by means of the support structures already mentioned above in order to obtain the heat exchanger which must be constructed so as to be self-supported over the length thereof.

Accordingly, the manufacture of a heat exchanger of the known type is relatively cumbersome and requires time-consuming work steps. In addition, the manufacture becomes more difficult because of measures required for avoiding damage to the surface protection applied by means of dipping during the assembly of the heat exchanger.

Moreover, due to the inner negative pressure and/or the outer excess pressure, significant forces act on the large-area sides of the slender exchanger tubes. Consequently, when a certain degree of slenderness is exceeded, the sides of the tubes are pressed-in if suitable measures, such as, supports, are not provided. In this connection, an embodiment of the known proposal provides that the sides of the tubes are supported relative to each other by means of at least one internal transverse web.

SUMMARY OF THE INVENTION

It is the object of the present invention to improve a heat exchanger of the type described above. In particular, the manufacture of the heat exchanger is to be simplified and the material required for manufacturing the heat exchanger is to be reduced. The heat exchanger should have large heat exchanger surfaces with low flow resistance to the outer and inner exchanger media, while bending stresses and distortions of the ribs are essentially avoided.

In accordance with the present invention, the exchanger tubes are composed of tube shells which are welded together at the longitudinal edges thereof and the exchanger tubes are connected to the respectively adjacent exchanger tube by means of the fins attached to the sides of the tubes.

As a result of this configuration, a heat exchanger is provided which can be considered a composite tube exchanger which, because of the direct connection of the adjacent exchanger tubes by means of the fins located between the tubes and to the tube plate at the end, the heat exchanger is now self-supporting and has a high stiffness against twisting or buckling. Because the ribs are fastened to the two adjacent exchanger tubes, the fins as well as the sides of the tubes are essentially only subjected to tensile stresses when a vacuum exists in the exchanger tubes, or are subjected only to compressive stresses when an excess pressure exists in the exchanger tubes. As a consequence, it is now possible to produce heat exchanger tubes with very wide sides of 300 mm and more. Also, a high section modulus (moment of inertia) is obtained and, while the exchanger tubes are narrow, large heat exchanger surfaces are created which have a low flow resistance to the outer and inner exchanger media.

Another particular advantage of the invention resides in the fact that, due to the large widths of sides of the tubes and the fact that the fins connect the exchanger tubes directly, the heat exchanger has such a stiffness that it is possible to galvanize the entire heat exchanger. There is no danger that the high-temperature yield strength will be exceeded. Consequently, the galvanization is significantly simpler as compared to the galvanization of the individual tubes. The width of such a heat exchanger can be easily adapted to the conventional width of a zinc bath because the heat exchanger does not require additional support structures because of its excellent stiffness.

In addition, it is also possible to galvanize the tube plates as well as distribution chambers and collection chambers connected thereto, at the same time as the exchanger tubes, which results in a further reduction of the manufacturing costs. It is a particular advantage in this connection that the gaps between the tube ends and the recesses in the tube plates adapted to the cross-sections of the exchanger tubes are completely filled with zinc because of the capillary effect. As a result, these locations of the heat exchanger are improved which in the past frequently were problem zones.

There is little danger that the heat exchanger will be deformed during dipping. A permanent deformation can be essentially excluded. The fins rest with a large surface area against the sides of the tubes, so that an effective heat transfer can be ensured.

The quantity of material required is also reduced because the fins are only attached and are no longer cut out in accordance with the cross-section of the exchanger tubes.

The heat exchanger according to the present invention can be manufactured by initially producing tube shells which correspond to the desired cross-section of the tubes. When the tube shells are placed against each other at the longitudinal edges thereof, an exchanger tube is obtained. Simultaneously, the fins can be produced separately. Subsequently, always two tube shells are connected through the ribs to form composite structural components and these structural components are then combined to form a heat exchanger of the desired width by welding the longitudinal edges of the tube shells together. The tube plates are then attached to the exchanger tubes. The heat exchanger can now be completely galvanized.

Although there are several possibilities for fastening the ribs to the sides of the tubes of the heat exchanger, a preferred feature of the present invention provides that the fins are welded to the sides of the tubes.

In accordance with another feature of the invention, the fins can be welded to the tube shells through longitudinal slots which are provided in the sides of the tubes and extend parallel to the longitudinal edges of the tube shells. After the tube shells have been placed on the ribs, the ribs are fixedly connected to the tube shells by applying welding material by means of a conventional welding process from the inside into the longitudinal slots.

Another possibility of connecting the fins to the tube shells resides in utilizing a fusion welding process. In this process, the fins are welded to the tube shells by means of at least one fusion welding beam which is directed towards the inner sides of the tube shells. Preferably, the welding process is carried out by guiding, for example, laser beams or electron beams in a zig-zag fashion over the inner surfaces of the tube shells, so that the fins which rest against the outer sides of the tube shells are fixedly connected to the tube shells. Consequently, even before galvanization, an extremely good heat-conducting connection of the tube shells with the fins is obtained. Since the inner sides of the tube shells are completely smooth, it is possible without problems to provide the protective gas atmosphere required for using the fusion welding process.

The fins are connected to the tube shells preferably in the following manner.

Initially, the quantity of ribs which corresponds to the length of the heat exchanger tube, i.e. individual ribs or components of a closed rib strip, is placed in contact with the outer side of a tube shell through the bases of the ribs or contact portions of the strip. Subsequently, the fins are moved together with the tube shell at identical speeds in longitudinal direction of the tube shell and are welded together from the inside of the tube shell by means of a fusion welding beam (laser beam, electron beam) which is guided back and forth over the entire width of the tube side in a direction which extends obliquely to the direction of movement of the tube shell and of the fins. The tube shell which is now equipped with fins is turned by 180° and the free fin bases or free contact portions are placed on the outer side of another tube shell. The tube shell which has the fins attached to it and the additional tube shell are then moved together at identical speeds and the free fin bases or free contact portions are again welded from the inside of the additional tube shell by means of a fusion welding beam which is guided back and forth over the entire width of the tube side of the additional tube shell in a direction extending obliquely to the direction of movement of the tube shells.

In accordance with another method which differs from the one described above, the ribs can be welded simultaneously to two adjacent tube shells. In this case, it is necessary to guide fusion welding beams from both directions against the inner sides of the tube shells for simultaneously welding fins to the two tube shells.

In accordance with another feature of the invention, the fins are glued to the tube sides.

In accordance with the present invention, the fins may have different configurations. In accordance with an advantageous feature, the fins connecting the exchanger tubes are individual fins having an U-shaped cross-section which includes a fin web and two fin bases extending perpendicularly to the fin web. As a result, these individual fins can be manufactured in a relatively simple manner continuously on appropriate machines and can immediately subsequently be connected to the tube shells.

Another feature of the invention provides that spacers which are longer than the rib bases are punched out of the fin webs and are bent so as to extend parallel to the fin bases. As a result, the spacers support the rib webs which are arranged essentially parallel next to each other and contribute to the prevention of twisting of the thin fin webs when loads are applied to the sides of the tubes. In addition, the spacers provide free spaces in the regions of the fin bases. Consequently, fillet weld-type transitions are created during galvanization between the outer surfaces of the tube sides and fin bases which contribute to a marked improvement of the heat flow.

In accordance with another feature, the spacers have a trapezoidally-shaped configuration. They are arranged either uniformly or non-uniformly over the length as well as over the height of the fin webs. Other configurations are also conceivable because they produce turbulences at the fin surfaces and, thus, contribute to the improvement of the heat exchange.

In accordance with another advantageous feature, the fins which connect two exchanger tubes are components of a meander-like angled fin strip which includes distance portions determining the spacing between two adjacent exchanger tubes, wherein the distance portions are greater than contact portions which are connected to the tube sides. Thus, the fins are not individual strips but they are a component of a closed fin strip which is fixed by means of its contact portions to the tube sides of the adjacent tube shells.

The turbulences of the outer exchanger medium are improved or intensified by providing at least two bent portions in the distance portions, wherein the bent portions are offset relative to each other in flow direction of the outer exchanger medium.

The ends of the exchanger tubes are inserted in cutouts of the tube plate which are adapted to the cross-section of the exchanger tubes and the exchanger tubes are welded with the end faces thereof to the tube plates. The connection is advantageously effected by means of conventional welding. It is also possible to use fusion welding beams which are preferably guided in the plane of the gap between the tube ends and the walls of the cutouts in the tube plates.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 1 is a perspective partial view of a heat exchanger according to the present invention;

FIG. 2 is a horizontal cross-sectional view, on a larger scale, along sectional line II—II of FIG. 1, showing the manner of fastening a tube end to a tube plate;

FIG. 3 is a perspective partial view showing the connection of tube shells and fins; and FIG. 4 is a perspective view, on a larger scale, showing a detail of the heat exchanger of FIG. 1.

DESCRIPTION OF THE PREFERRED EMBODIMENTS

FIG. 1 of the drawing shows a heat exchanger 1 which is composed of altogether eight exchanger tubes 2 which are arranged next to each other in a row. Fins 3 are mounted between the exchanger tubes 2. The tube ends 4 are received in tube plates 5 which may be at least indirect components of distribution or collection chambers, not shown. The exchanger tubes 2 have a slender cross-section in flow direction SR of the outer exchanger medium. The length L, corresponding to the width of the tube side except for the rounded end portions 12, is a multiple of the width B of a heat exchanger tube 2. The exchanger tubes 2 are formed by tube shells 7 which are connected to each other at the longitudinal edges 6 thereof, wherein the edges b are joined in any well known manner familiar to those skilled in the art, such as a butt-type joint, as can be seen in FIGS. 3 and 4.

The fins 3a between the exchanger tubes 2 may have a U-shaped cross-section, as can be seen in FIG. 3 in the area designated by A. The U-shaped cross-section is composed of the fin web 8 extending transversely of the flow direction SR of the outer exchanger medium and fin bases 9 extending perpendicularly to the fin web 8. The fin bases 9 are in contact with the outer sides 10 of the tube sides 11.

As also shown in portion A of FIG. 3, trapezoidally-shaped spacers 13 can be provided at the fin webs 8 of the U-shaped fins 3a. The spacers 13 are punched out of the rib webs 8 and are bent by 90°. Advantageously, these spacers 13 have a length which is slightly greater than the length of the fin bases 9, so that the distance between two adjacent U-shaped fins 3a is exactly determined by the spacers 13.

As illustrated in portion B of FIG. 3, the two exchanger tubes 2 can also be connected by means of fins 3b which are components of a meander-like fin strip 14. In this rib strip 14, the width B1 of the distance portions 15 which determine the distance between two exchanger tubes 2 is greater than the width B2 of the contact portions 16 which are placed on the outer sides 10 of the tube sides 11. In addition, it can be seen in FIG. 3 that several transversely bent portions 17 are provided along the length of each distance portion 15. Consequently, the bent portions form spacer portions 15 and contact portions 16 which are offset relative to each other and serve to produce turbulences which ensure an improved heat transfer. One of the contact portions 16 rests against one of the tube shells 7 and the other of the contact portions 16 rest against the adjacent tube shell 7.

For fastening the fins 3a, 3b, to the tube shells 7, as can be seen in FIG. 3, longitudinal slots 18 are provided in the tube sides 11 of the tube shells 7. These longitudinal slots 18 extend parallel to the longitudinal edges 6 of the tube shells 7. After the fins 3a, 3b and the tube shells 7 have been placed against each other in the manner shown in FIG. 3, a conventional welding process can be used for filling the longitudinal slots 18 with welding material and to obtain an excellent connection between the fin bases 9 for the contact portion 16 with the tube shells 7. The welding seams are schematically indicated in FIG. 3 by reference numeral 19.

In another possibility of fastening the fins 3a, 3b to the outer surfaces 10 of the tube sides 11, a fusion welding beam 20, for example, a laser beam, is guided in a zig-zag fashion over the inner surfaces 22 of the tube sides 11 as indicated by dash-dot lines 21 in FIG. 3, so that the fin bases 9 or the contact portions 16 are connected to the tube shells 7.

As shown in FIGS. 1 and 2 of the drawing, the tube ends 4 are placed in the tube plates 5 in recesses 23 which are adapted to the cross-section of the heat exchanger tubes 2 and are welded in the areas of the end faces 24 to the tube plates 5. A conventional welding process or a fusion welding process can be used for welding the tube ends 4 to the tube plates 5.

While specific embodiments of the invention have been shown and described in detail to illustrate the inventive principles, it will be understood that the invention may be embodied otherwise without departing from such principles.

We claim:

1. A method of manufacturing a heat exchanger, the heat exchanger including a plurality of exchanger tubes having tube sides, and strips of fins extending transversely of and connecting the tube sides, the exchanger tubes having an elongated cross-section in a flow direction of an outer exchanger medium, the exchanger tubes having a length which is several times greater than the width thereof, wherein the exchanger tubes are arranged in a row extending transversely of the flow direction of the outer exchanger medium, wherein the exchanger tubes have ends, and wherein the exchanger tubes are composed of tube shells having longitudinal edges and inner and outer surfaces, the method comprising initially placing one of the tube shells on one of the strips of fins and welding the outer surface of the tube shell to an edge of the strip of fins by directing a fusion welding beam against the inner surface of the tube shell, such that a fusion welded connection is formed between the outer surface of the tube shell and the edge of the strip of fins, further comprising welding the tube shells together at the longitudinal edges thereof to produce the exchanger tubes, and inserting the ends of the exchanger tubes into cutouts of tube plates, the cutouts having inner surfaces, the cutouts being adapted to the cross section of the exchanger tubes, and welding the ends of the exchanger tubes to the inner surfaces of the cutouts.

2. The method according to claim 1, comprising guiding the fusion welding beam in a zig-zag pattern along the inner surface of the tube shell.

* * * * *